Nov. 6, 1923.  
G. L. E. KLINGBEIL  
1,472,916  
SPRING SPREADER FOR VEHICLE SPRINGS  
Filed April 13, 1923  
2 Sheets-Sheet 1

Inventor  
G. L. E. Klingbeil,  
By Samuel Herrick,  
Attorney

Nov. 6, 1923.

G. L. E. KLINGBEIL 1,472,916

SPRING SPREADER FOR VEHICLE SPRINGS

Filed April 13, 1923    2 Sheets-Sheet 2

Inventor

G.L.E. Klingbeil,

By Samuel Herrick,

Attorney

Patented Nov. 6, 1923.

1,472,916

UNITED STATES PATENT OFFICE.

GOTTLIEB L. E. KLINGBEIL, OF OMAHA, NEBRASKA.

SPRING SPREADER FOR VEHICLE SPRINGS.

Application filed April 13, 1923. Serial No. 631,811.

*To all whom it may concern:*

Be it known that GOTTLIEB L. E. KLING-BEIL, citizen of the United States, residing at Omaha, in the county of Douglas and State of Nebraska, has invented certain new and useful Improvements in Spring Spreaders for Vehicle Springs, of which the following is a specification.

This invention relates to spring spreaders for vehicle springs and more particularly for automobile springs. It is a well known fact that vehicles and particularly automobiles are rendered "easy riding" and many objectionable squeaks are eliminated if the springs are properly lubricated from time to time. However, this work is frequently neglected by the owner of the automobile because of the difficulty of separating the leaves of the springs. For the same reason the cost of having this work done at a garage is considerable. The object of the present invention is to provide a spring spreader constructed in such manner that by a powerful actuating mechanism all of the leaves of a spring will be separated simultaneously and automatically held in such separated condition during the time that they are being lubricated or otherwise worked upon.

A spring spreader possessing the foregoing characteristics is illustrated in my co-pending applications Serial Numbers 586,775 and 586,776, filed on the 7th day of September, 1922, and Serial Number 623,508, filed on the 7th day of March, 1923, and the present application is intended to cover certain improvements in the construction illustrated in the foregoing applications.

The improvements upon which particular stress is laid in the present application are as follows:

(a) An improved actuating mechanism for the standards in moving their upper portions forcibly toward each other, this mechanism being so arranged that its proper action is not interferred with even though the standards may be adjusted bodily toward and from each other to suit springs of varying widths.

(b) Improved means for adjusting the lower portions of the standards toward and from each other, the same being so arranged as to insure that the same degree of movement will be imparted to each of said standards so that no binding of the actuating links will occur by reason of one standard being moved further than the other.

(c) Improved means for adjusting the banks of wedges vertically with respect to the standards so that fine adjustment may be secured.

(d) The provision of an improved type of dog or wedge, and (e) Improved means for adjusting the upper portions of the standards toward and from each other independently of the actuating links as hereinafter set forth.

Like numerals designate corresponding parts in all of the figures of the drawing.

Figure 1:
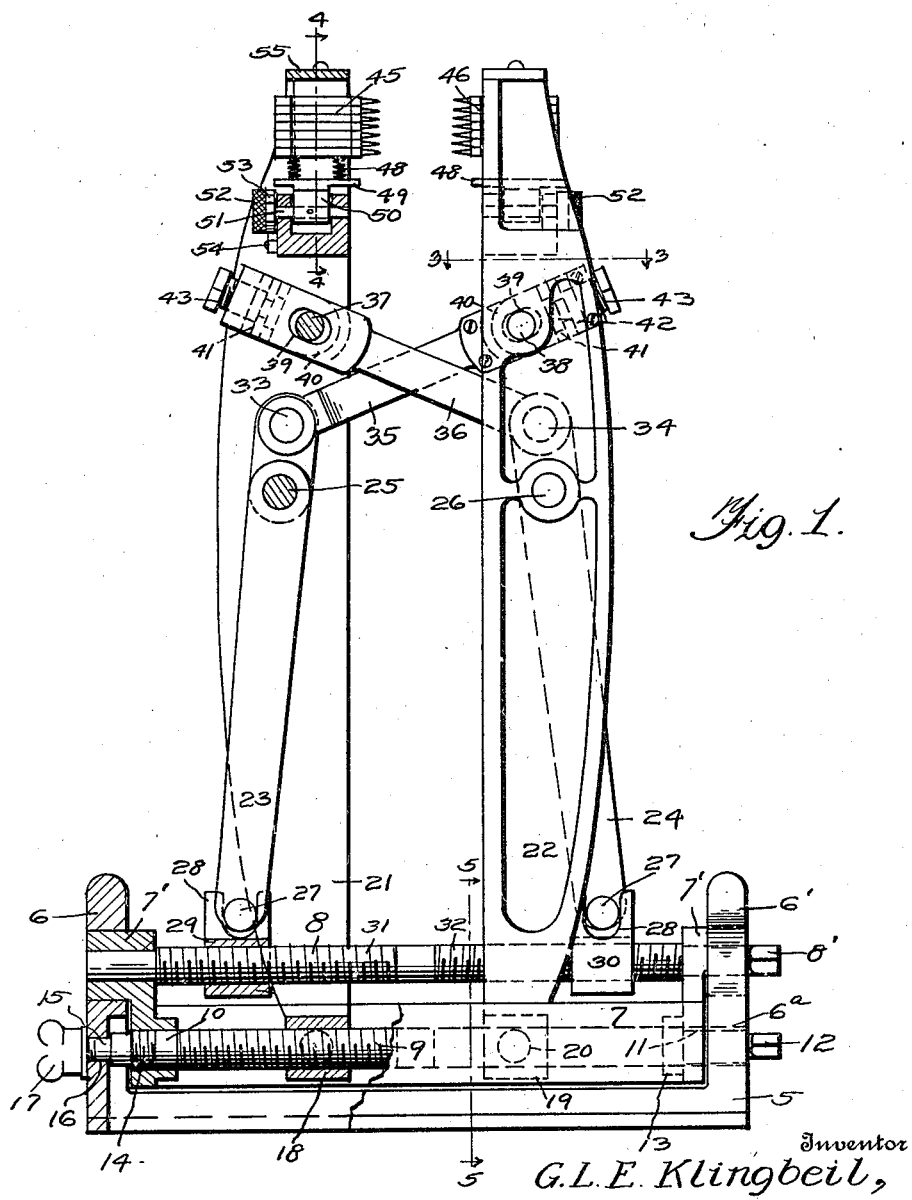
Fig. 1 is a view partly in side elevation and partly in vertical section of a spring spreading device constructed in accordance with the invention.
Figure 2:
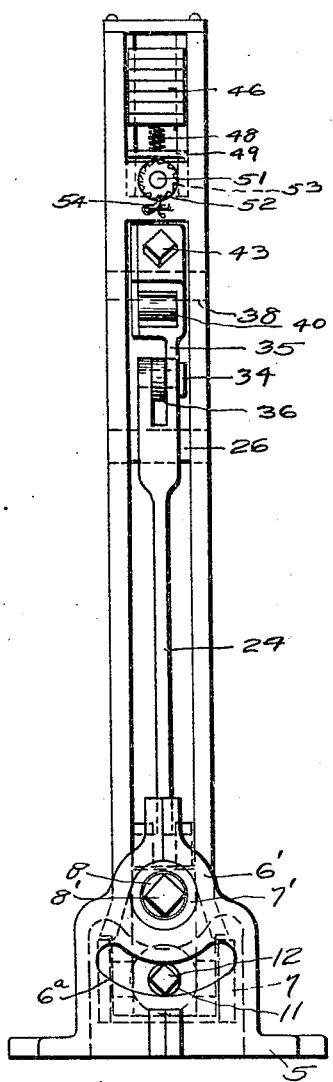
Fig. 2 is an end elevation thereof.

In the drawings 5 designates a supporting base having the upturned ends 6, 6'. A longitudinally slotted frame 7 is mounted for rocking movement in the ends 6, 6' of the base through the medium of hollow trunnions 7', 7'. A right and left threaded screw 8 is journaled in said trunnions and is provided with an end 8' of suitable shape to be engaged by an actuating tool, to be turned. A second right and left screw 9 has non-threaded portions 10 and 11 journaled in the ends of the frame 7 and is provided with an end 12 suitably shaped for the reception of an actuating tool. The right hand end portion of the screw 9 projects through an arcuate slot $6^a$ formed in the vertical portion 6' of the base. Endwise movement of the screw 9 toward the right is limited by a collar 13, while endwise movement of this screw toward the left is limited by a plug 14 which has an extension 15 projecting outwardly through an arcuate slot 16 formed in the vertical portion 6 of the base 5. A thumb nut 17 threaded upon the portion 15 of the plug provides means for binding the tilting frame 7 in tilted position. Trunnion blocks 18 and 19 threaded upon the oppositely threaded portions of the screw 9 carry trunnions 20 which project laterally from said blocks and engage the lower portions of the standards 21 and 22. It is manifest that if the screw 9 be rotated the trunnion blocks will be caused to travel toward or from each other, as the case may be, to thus advance or retract the lower portions of the standards and that the construction is such that each standard will be moved to the same extent. This adjustment provides means for adjusting the standards to take care of springs of varying widths, while the tilting of the frame brings the wedges hereinafter described to the proper inclination to engage springs of varying inclination. For moving the upper portions of the standards forcibly toward each other to bring the wedges referred to into forcible engagement with the leaves of the springs for the purpose of spreading said leaves, links 23 and 24 are pivoted at 25 and 26 to the standards 21 and 22, respectively. The lower portions of these links are provided with laterally extending studs 27 which engage in the forked portions 28 of the traveling blocks 29 and 30, the latter being mounted upon the oppositely threaded portions 31 and 32 of the screw 8. The upper ends of the links 23 and 24 are pivotally connected at 33 and 34 to cross links 35 and 36, said cross links being, in turn, pivotally connected at 37 and 38 to the standards 21 and 22.

Figure 3:
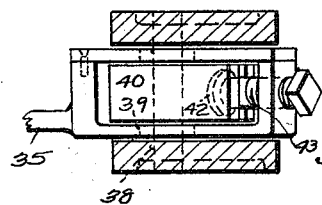
Fig. 3 is a detail view of the connection between one of the cross links and one of the standards. This section is taken on line 3—3 of Fig. 1.
Figure 4:
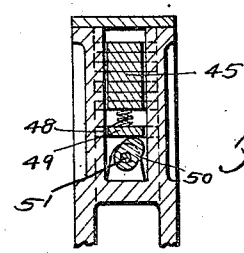
Fig. 4 is a detail vertical sectional view through the upper end of one of the standards showing one of the banks of wedges in section. This section is taken on line 4—4 of Fig. 1.
Figure 5:
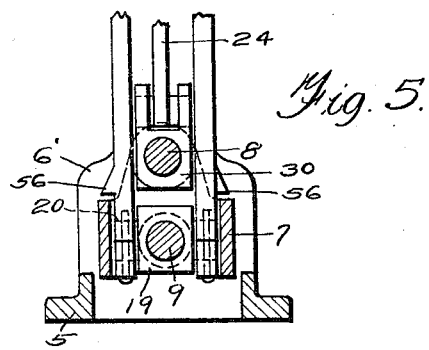
Fig. 5 is a vertical sectional view through the base on line 5—5 of Fig. 1.

Thus it is manifest that if the screw 8 be rotated traveling blocks 29—30 will be caused to move toward or from each other, as the case may be, and that if the screw be rotated in such direction as to cause these blocks to move toward each other the lower ends of the links 23 and 24 will be forced toward each other with the result that said links will act to move the standards toward each other with great force, said links acting directly upon the pivots 25 and 26 and further acting through the cross links 35 and 36 upon the pivots 37 and 38 to effect the results stated. In order to adjust the upper portions of the standards toward and from each other the connection between the cross links 35 and 36 and the pivots 37—38, respectively, is rendered an adjustable one. This is accomplished by constructing these links as illustrated in Fig. 3 from which it will be seen that the outer portions of these links are bifurcated and that the side walls of these bifurcated portions are provided with elongated slots in which the pivots 37 and 38 are received, said slots being indicated at 39. Blocks 40 disposed in the bifurcated portions of the levers snugly engage the pivots 37 and 38 and these blocks are provided with T slots 41 which receive a correspondingly shaped end 42 of screws 43 which screws are threaded in the outer portions of the links 35 and 36. Thus by turning these screws the said blocks will be adjusted longitudinally within the bifurcated portions of the links and thus the effective length of the links will be varied.

Figure 6:
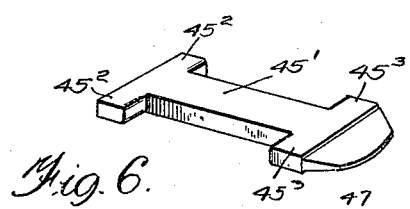
Fig. 6 is a detail perspective view of one of the wedges.

The upper portions of the standards are vertically slotted or bifurcated and banks of wedges 45 and 46 are seated in these vertically slotted portions. The shape of these wedges is illustrated in Fig. 6 from which it will be seen that they comprise shanks $45'$, laterally extending tail portions $45^2$ which prevent forward movement of the wedges with respect to the standards and laterally extending heads $45^3$ which prevent rearward movement of the wedges with respect to the standards. The faces of the heads are tapered and rounded, as indicated at 47, so that said wedges will seek and center themselves in the openings between the respective leaves of the springs (not shown). Said wedges are supported upon springs 48 and these springs, in turn, are carried by plates 49, said plates and springs and consequently the wedges supported thereon being vertically adjustable in the bifurcated portions of the standards by means of cams 50. These cams are carried by shafts 51 and said shafts are provided with knurled heads 52 by which they may be turned. Said shafts further carry ratchets 53 which coact with pawls 54 carried by the standards. It will be understood that by reason of the eccentric mounting of the cams with respect to the shafts 51 turning movement of said shafts raises or lowers the plates 49 to thereby raise or lower the banks of wedges as a whole. Cap plates 55 prevent the wedges from falling out of the bifurcated portions of the standards when said standards are tipped over as is frequently necessary in passing the machine beneath a vehicle axle. Lugs 56 on the standards limit the movement of said standards away from each other.

It is to be understood that the invention is not limited to the precise construction set forth but that it includes within its purview whatever changes fairly come within either the terms or the spirit of the appended claims.

Having described my invention what I claim is:

1. A spring spreading device of the character described comprising a pair of standards, wedges carried by said standards at the upper ends thereof, means for moving the upper portions of said standards forcibly toward each other and means for adjusting the lower portions of said standards toward and from each other comprising a right and left threaded screw and members to which traveling movement is imparted by said screw and upon which the lower portions of the standards are supported.

2. A spring spreading device of the character described comprising a pair of vertical standards, wedges carried thereby, means for moving the upper portions of said standards forcibly toward each other, trunnion blocks upon which the lower ends of said standards are pivoted and a right and left threaded screw with which said trunnion blocks are engaged.

3. A structure as recited in claim 2 in combination with a tiltable frame in which said right and left threaded screw is mounted.

4. A spring spreading device of the character described comprising a pair of vertical standards, wedges carried by said standards at the upper ends thereof and means for moving the upper portions of said standards forcibly toward each other comprising a pair of cross links pivotally engaged with said standards, links pivotally connected to said cross links and to said standards, traveling blocks at the lower ends of said links, means for imparting movement to said traveling blocks and means for establishing sliding connection between said blocks and the lower ends of said links.

5. A structure as recited in claim 4 wherein the means for causing the blocks to travel comprises a right and left threaded screw upon which said blocks are mounted.

6. A spring spreading device of the character described comprising a pair of standards having bifurcated upper ends, means for moving the upper portion of said standards forcibly toward each other, banks of wedges loosely mounted in the bifurcated upper portions of said standards and cams below said wedges and acting to adjust said banks of wedges vertically.

7. The combination with a pair of standards having vertically slotted upper portions, of banks of wedges mounted in said vertically slotted portion, plates beneath said banks of wedges, eccentric cams acting against the under sides of said plates and means for rotating said cams.

8. The combination with a pair of standards and banks of wedges at the upper ends thereof, of means for forcing said standards toward and from each other comprising a pair of cross links, a pair of levers pivoted to said cross links and to the standards, means for moving the lower portions of said levers forcibly toward and from each other and means for varying the effective length of said cross links.

9. A structure as recited in claim 8 wherein the means for varying the effective length of said cross links comprise screws engaged with said links, blocks longitudinally adjustable with respect to said links under the influence of said screws and engaged with the pivot.

In testimony whereof he affixes his signature in the presence of two witnesses.

GOTTLIEB L. E. KLINGBEIL.

Witnesses:
 IDA SHAFTON,
 FRANK SIMON.